United States Patent
Yee et al.

(10) Patent No.: US 10,116,236 B2
(45) Date of Patent: Oct. 30, 2018

(54) ISOLATED SWITCHING MODE POWER SUPPLY WITH MESSAGE CONTROL BETWEEN SR AND PRIMARY SIDE, AND CONTROL METHOD THEREOF

(71) Applicant: Sync Power Corp., Taipei (TW)

(72) Inventors: Hsian-Pei Yee, Taipei (TW); Ya-Wu Chung, Taipei (TW); Chun-Jen Huang, Taipei (TW)

(73) Assignee: Sync Power Corp., Taipei (TW)

( * ) Notice: Subject to any disclaimer, the term of this patent is extended or adjusted under 35 U.S.C. 154(b) by 0 days.

(21) Appl. No.: 15/412,046

(22) Filed: Jan. 22, 2017

(65) Prior Publication Data
US 2018/0212526 A1 Jul. 26, 2018

(51) Int. Cl.
| | |
|---|---|
| *H02M 7/49* | (2007.01) |
| *H02M 7/493* | (2007.01) |
| *H02H 7/30* | (2006.01) |
| *H02H 3/093* | (2006.01) |
| *H02M 3/335* | (2006.01) |
| *H02M 1/32* | (2007.01) |

(52) U.S. Cl.
CPC ............ *H02M 7/493* (2013.01); *H02H 3/093* (2013.01); *H02H 7/30* (2013.01); *H02M 1/32* (2013.01); *H02M 3/33507* (2013.01); *H02M 3/33592* (2013.01); *Y02B 10/14* (2013.01)

(58) Field of Classification Search
CPC ............................................ H02M 3/335–3/42
See application file for complete search history.

(56) References Cited

U.S. PATENT DOCUMENTS

| | | | | |
|---|---|---|---|---|
| 8,854,842 B2* | 10/2014 | Zheng | ............... | H02M 3/33576 363/21.13 |
| 2014/0169050 A1* | 6/2014 | Gong | ............... | H02M 3/33592 363/89 |
| 2015/0280576 A1* | 10/2015 | Hinz | ................. | H02M 3/33507 363/21.15 |

* cited by examiner

*Primary Examiner* — Kyle J Moody
*Assistant Examiner* — Peter Novak
(74) *Attorney, Agent, or Firm* — CKC & Partners Co., Ltd.

(57) ABSTRACT

An isolated switching mode power supply and a control method of the isolated switching mode power supply are provided. The isolated switching mode power supply includes a primary side circuit and a secondary side circuit. The primary side circuit includes a controller. The secondary side circuit is coupled to the primary side circuit and includes a winding, a switch, and an SR controller. The winding is coupled to the primary side circuit. The switch is coupled to the winding. The SR controller is coupled to the winding and the switch. The SR controller turns off the switch to trigger the winding to feed back a first message to the primary side circuit. The controller enables the primary side circuit to transfer energy to the secondary side circuit if the controller detects the first message.

18 Claims, 7 Drawing Sheets

ISOLATED SWITCHING MODE POWER SUPPLY WITH MESSAGE CONTROL BETWEEN SR AND PRIMARY SIDE, AND CONTROL METHOD THEREOF

BACKGROUND

Technical Field

The present disclosure relates to an isolated switching mode power supply and a control method of the isolated switching mode power supply. More particularly, the present disclosure relates to an isolated switching mode power supply having a synchronous rectifier (SR) controller disposed on the secondary side, and a control method of the isolated switching mode power supply.

Description of Related Art

FIG. 1 is a schematic diagram of a conventional isolated switching mode power supply 100. In isolated switching mode power supplies 100, a conventional diode DD is not efficient. Therefore, in some applications, the diode DD is replaced by a SR (i.e., an active switch controlled by an SR controller as a diode) incorporated on the secondary side circuit, so as to increase the overall power supply efficiency. However, if the timing of the SR controller turning on or off the SR on the secondary side circuit is improper, it may have undesirable results on the isolated switching mode power supply 100. Therefore, it is important to design a proper mechanism of turning on and off the SR on the secondary side circuit for people with ordinary skills in the art.

SUMMARY

Accordingly, the present disclosure provides an isolated switching mode power supply and a control method of the isolated switching mode power supply. In the present disclosure, a mechanism of turning on and off the secondary switch disposed on the secondary side circuit is designed to mitigate the possibility of damaging the isolated switching mode power supply.

The present disclosure provides an isolated switching mode power supply. The isolated switching mode power supply includes a primary side circuit and a secondary side circuit. The primary side circuit includes a primary-side controller. The secondary side circuit is coupled to the primary side circuit, and includes a secondary winding, a secondary switch, and an SR controller. The secondary winding is coupled to the primary side circuit. The secondary switch is coupled to the secondary winding. The SR controller is coupled to the secondary winding and the secondary switch. The SR controller turns off the secondary switch and triggers the secondary winding to feed back a first message to the primary side circuit. If the primary-side controller detects the first message, then the primary-side controller enables the primary side circuit to transfer energy to the secondary side circuit.

The present disclosure provides a control method of an isolated switching mode power supply. The method includes the following steps: turning off, by the SR controller, the secondary switch to trigger the secondary winding to feed back a first message to the primary side circuit; and enabling, by the primary-side controller, the primary side circuit to transfer energy to the secondary side circuit if the primary-side controller detects the first message.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
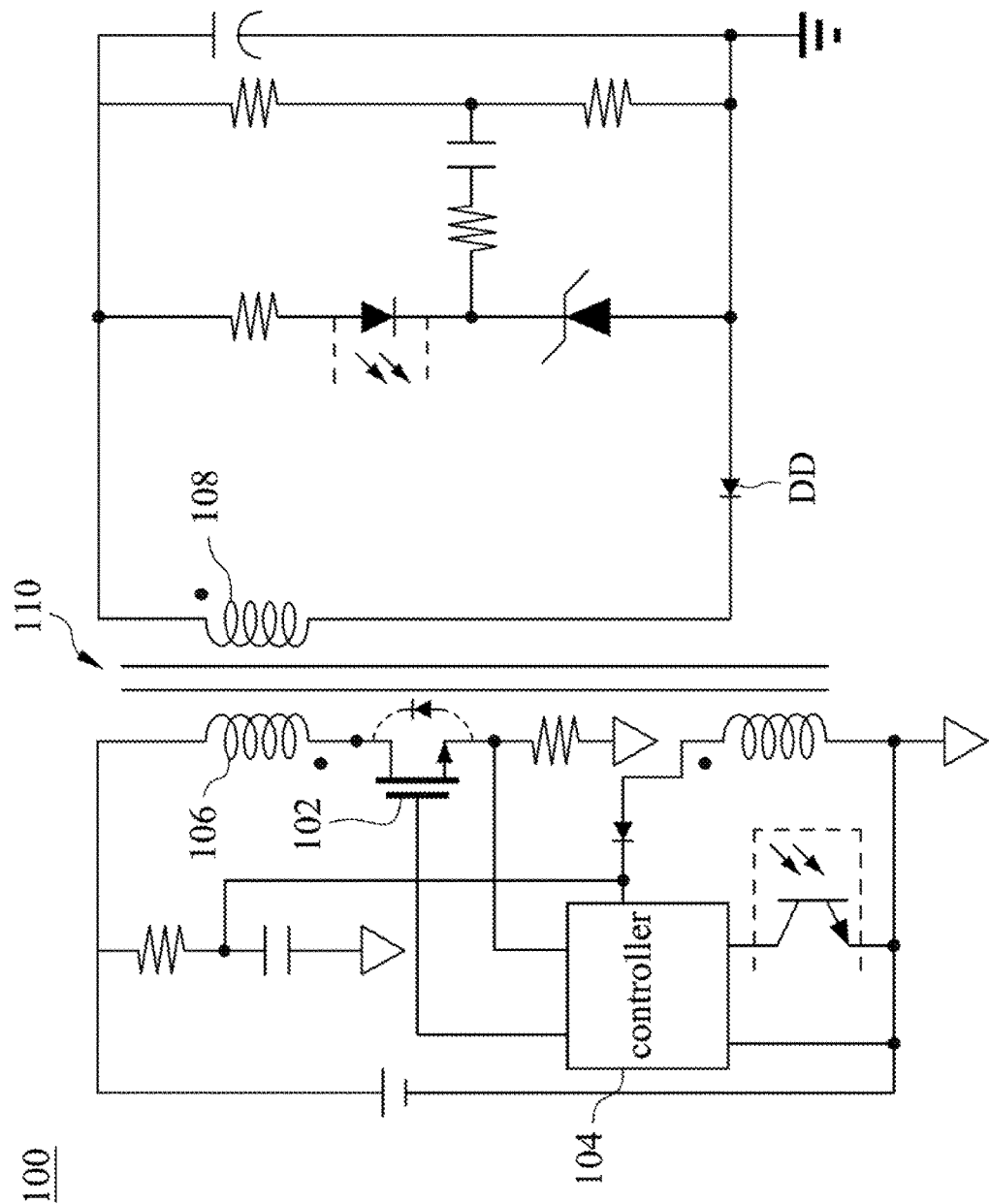
FIG. 1 is a schematic diagram of a conventional isolated switching mode power supply.
Figure 2:
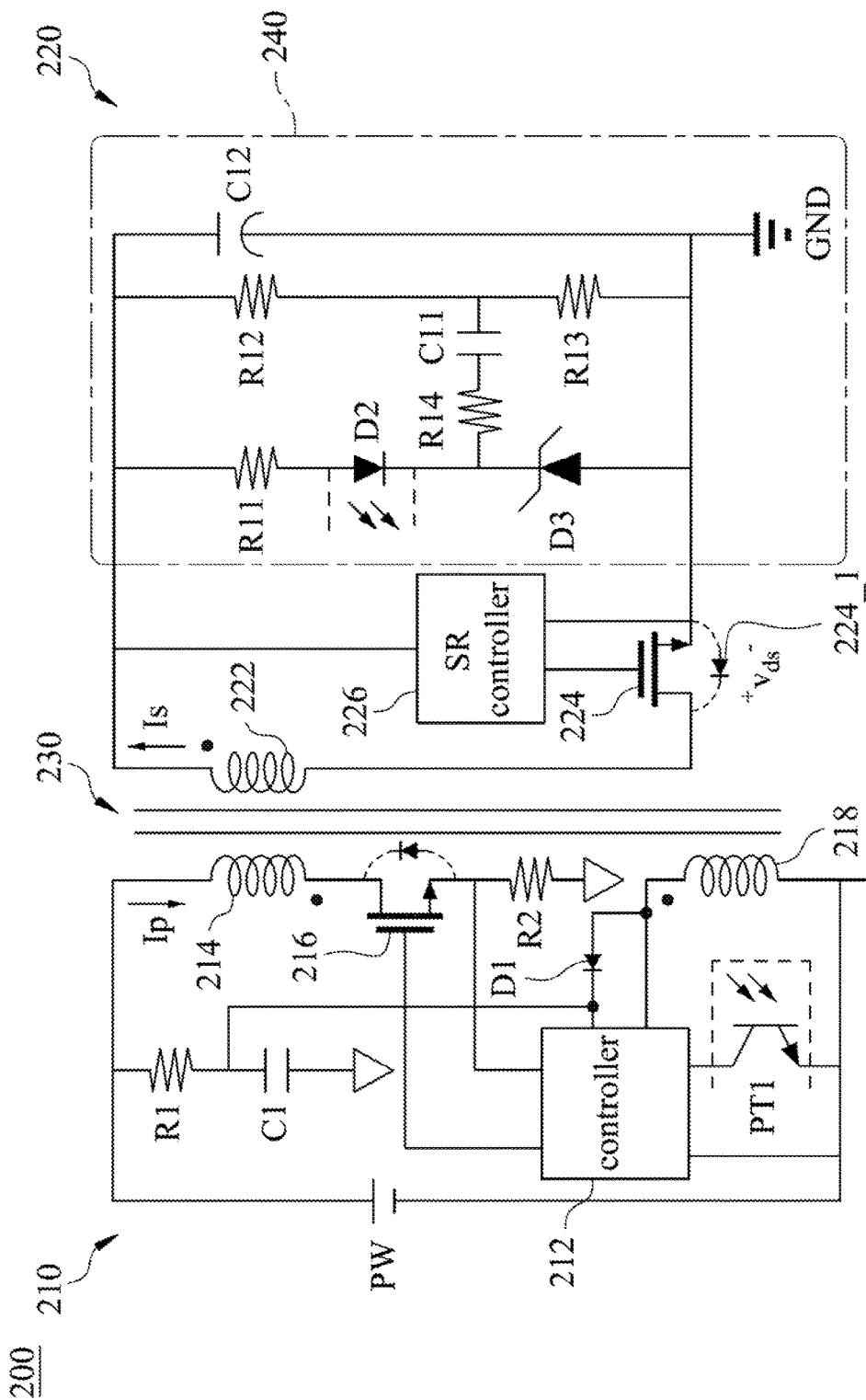
FIG. 2 is a schematic diagram illustrating an isolated switching mode power supply according to one embodiment of the present disclosure.

FIG. 2 is a schematic diagram illustrating an isolated switching mode power supply 200 according to one embodiment of the present disclosure. In FIG. 2, the isolated switching mode power supply 200 includes a primary side circuit 210 and a secondary side circuit 220. The primary side circuit 210 includes a primary-side controller 212, a primary winding 214, a primary switch 216 and an additional winding 218. The primary-side controller 212 may be a secondary side regulation (SSR) controller, but the disclosure is not limited thereto. A first terminal of the primary winding 214 is coupled to a first terminal of the primary switch 216. A first output of the primary-side controller 212 is coupled to a control terminal of the primary switch 216. A first terminal of the additional winding 218 is coupled to a first input of the primary-side controller 212 through a diode D1, and is coupled to a second input of the primary-side controller 212. A second terminal of the additional winding 218 is coupled to a ground GND.

The secondary side circuit 220 is coupled to the primary side circuit 210. The secondary side circuit 220 includes a secondary winding 222, a secondary switch 224, an SR controller 226, and a load circuit 240. The secondary winding 222 is coupled to the primary side circuit 210, and may receive energy from the primary winding 214 by inducing the primary winding 214. The secondary switch 224 is coupled to the secondary winding 222. In some embodiments, the secondary switch 224 may be an SR Metal-Oxide-Semiconductor Field-Effect Transistor (MOSFET), which will revert to a passive conventional diode 224_1 after being turned off. The SR controller 226 is coupled to the secondary winding 222 and the secondary switch 224. The SR controller 226 may operate in a prediction mode or a current mode. In the present disclosure, the aforementioned switches can be regarded as transistors, in which a first terminal of the secondary switch can be referred to as a drain, a second terminal of the secondary switch can be referred to as a source, and a control terminal can be referred to as a gate, but the disclosure is not limited thereto.

In the secondary side circuit 220, a first terminal of the secondary winding 222 is coupled to a first terminal of the load circuit 240 and an input of the SR controller 226. A second terminal of the secondary winding 222 is coupled to a first terminal of the secondary switch 224. A control terminal of the secondary switch 224 is coupled to an output of the SR controller 226. A second terminal of the secondary switch 224 is coupled to a ground terminal of the SR controller 226 and a second terminal of the load circuit 240.

As described above, the SR controller 226 and the secondary switch 224 may be incorporated into the secondary side circuit 220 of the isolated switching mode power supply 200, so as to reduce the power consumption of the isolated switching mode power supply 200. However, if the secondary switch 224 is not turned off by the SR controller 226 before the primary switch 216 is turned on by the primary-side controller 212, the primary winding 214 and the secondary winding 222 may damage the transformer 230 due to reverse polarities. In other words, if the dead time between turning off the secondary switch 224 and turning on the primary switch 216 is too short, the isolated switching mode power supply 200 may be damaged due to a damaged transformer 230.

Therefore, the present disclosure provides a control method of the isolated switching mode power supply, so as to properly control the mechanism of turning on and off the primary switch 216 and the secondary switch 224.

Figure 3:
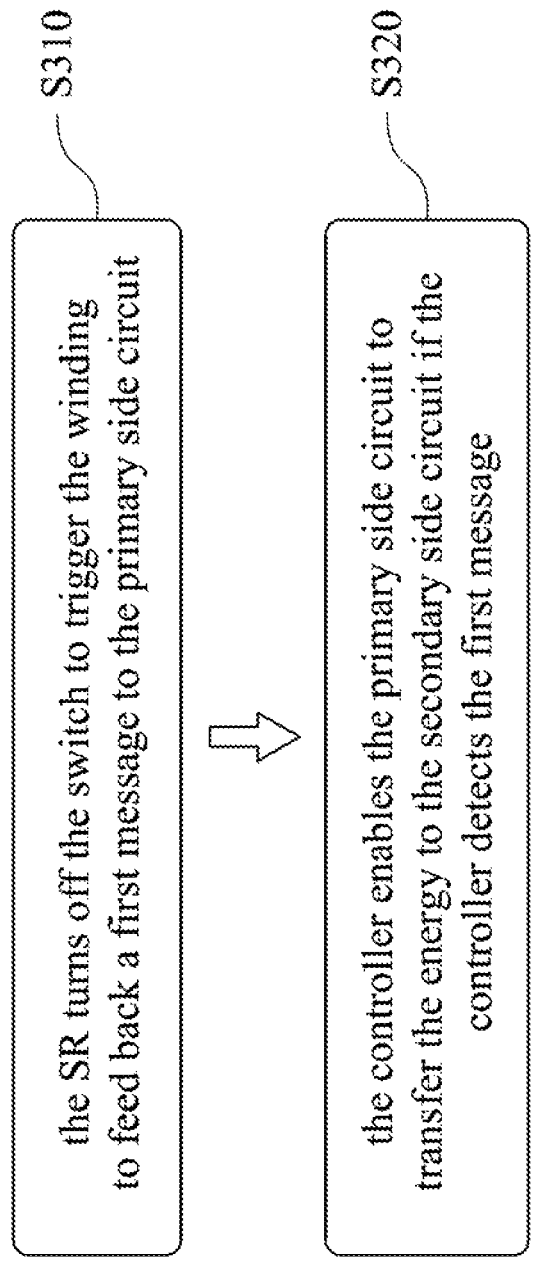
FIG. 3 is a flow chart illustrating a control method of the isolated switching mode power supply according to one embodiment of the present disclosure.

FIG. 3 is a flow chart illustrating the control method of the isolated switching mode power supply 200. In step S310, the SR controller 226 turns off the secondary switch 224 to trigger the secondary winding 222 to feed back a first message to the primary side circuit 210. In some embodiments, the first message may be a voltage change occurring on the additional winding 218 of the primary side circuit 210, and the additional winding 218 may receive the first message through inducing the secondary winding 222. In this situation, the SR controller 226 may turn off the secondary switch 224 to discharge the secondary winding 222 to cause the voltage change on the additional winding 218 of the primary side circuit 210, but the present disclosure is not limited thereto.

Next, in step S320, if the primary-side controller 212 detects the first message, the primary-side controller 212 may enable the primary side circuit 210 to transfer the energy to the secondary side circuit 220. In detail, if the primary-side controller 212 detects the first message, the primary-side controller 212 on the primary side circuit 210 will ascertain that the secondary switch 224 (e.g., the SR MOSFET) has been turned off to be reverted to the passive conventional diode 224_1. In this situation, the primary-side controller 212 may enable the primary side circuit 210 to transfer the energy to the secondary side circuit 220 without damaging the transformer 230. In some embodiments, the primary-side controller 212 enables the primary side circuit 210 to transfer the energy to the secondary side circuit 220 by turning on the primary switch 216, such that the secondary winding 222 can receive the energy by inducing the primary winding 214.

That is, the primary-side controller 212 cannot enable the primary side circuit 210 to transfer the energy to the secondary side circuit 220 if the primary-side controller 212 fails to detect the first message. On the other hand, the primary-side controller 212 is prohibited to enable the primary side circuit 210 to transfer the energy to the secondary side circuit 220 if the primary-side controller 212 fails to detect the first message. Accordingly, the secondary switch 224 and the primary switch 216 can be effectively prevented from being simultaneously turned on, such that the possibility of breaking the transformer 230 can be significantly reduced.

According to FIG. 2, the primary side circuit 210 further includes a power source PW, a first resistor R1, a capacitor C1, a second resistor R2, the diode D1, and a phototransistor PT1. The power source PW has a first terminal coupled to a second terminal of the primary winding 214, and a second terminal coupled to a ground terminal of the primary-side controller 212. The ground terminal of the primary-side controller 212 is coupled to the ground GND. A first terminal of the first resistor R1 is coupled to the first terminal of the power source PW, and a second terminal of the first resistor R1 is coupled to a first input of the primary-side controller 212. The capacitor C1 has a first terminal coupled to a second terminal of the first resistor R1, and a second terminal coupled to the ground GND. A first terminal of the second resistor R2 is coupled to a second terminal of the primary switch 216 and a second input of the primary-side controller 212, and a second terminal of the second resistor R2 is coupled to the ground GND. The diode D1 has an anode coupled to the first terminal of the additional winding 218, and a cathode coupled to the first input of the primary-side controller 212. The phototransistor PT1 has a first terminal coupled to a second output of the primary-side controller 212, and a second terminal coupled to the ground GND.

The load circuit 240 includes a first resistor R11, a light emitting diode D2, a Zener diode D3, a second resistor R12, a third resistor R13, a fourth resistor R14, a first capacitor C11, and a second capacitor C12. The first resistor R11 has a first terminal coupled to the first terminal of the secondary winding 222. The light emitting diode D2 has an anode coupled to a second terminal of the first resistor R11. The Zener diode D3 has a cathode coupled to a cathode of the light emitting diode D2, and an anode coupled to the ground GND. The second resistor R12 has a first terminal coupled to the first terminal of the secondary winding 222. The third resistor R13 has a first terminal coupled to a second terminal of the second resistor R12, and a second terminal coupled to the ground GND. The fourth resistor R14 has a first terminal coupled to the cathode of the light emitting diode D2. The first capacitor C11 has a first terminal coupled to the second terminal of the second resistor R12, and a second terminal coupled to a second terminal of the fourth resistor R14. The second capacitor C12 has a first terminal coupled to the first terminal of the secondary winding 222, and a second terminal coupled to the ground GND.

In some embodiments, the aforementioned voltage change occurring on the additional winding 218 may be a voltage increment and/or generating a voltage level lower than 0 volt, which will be described in the following paragraphs.

Figure 4A:
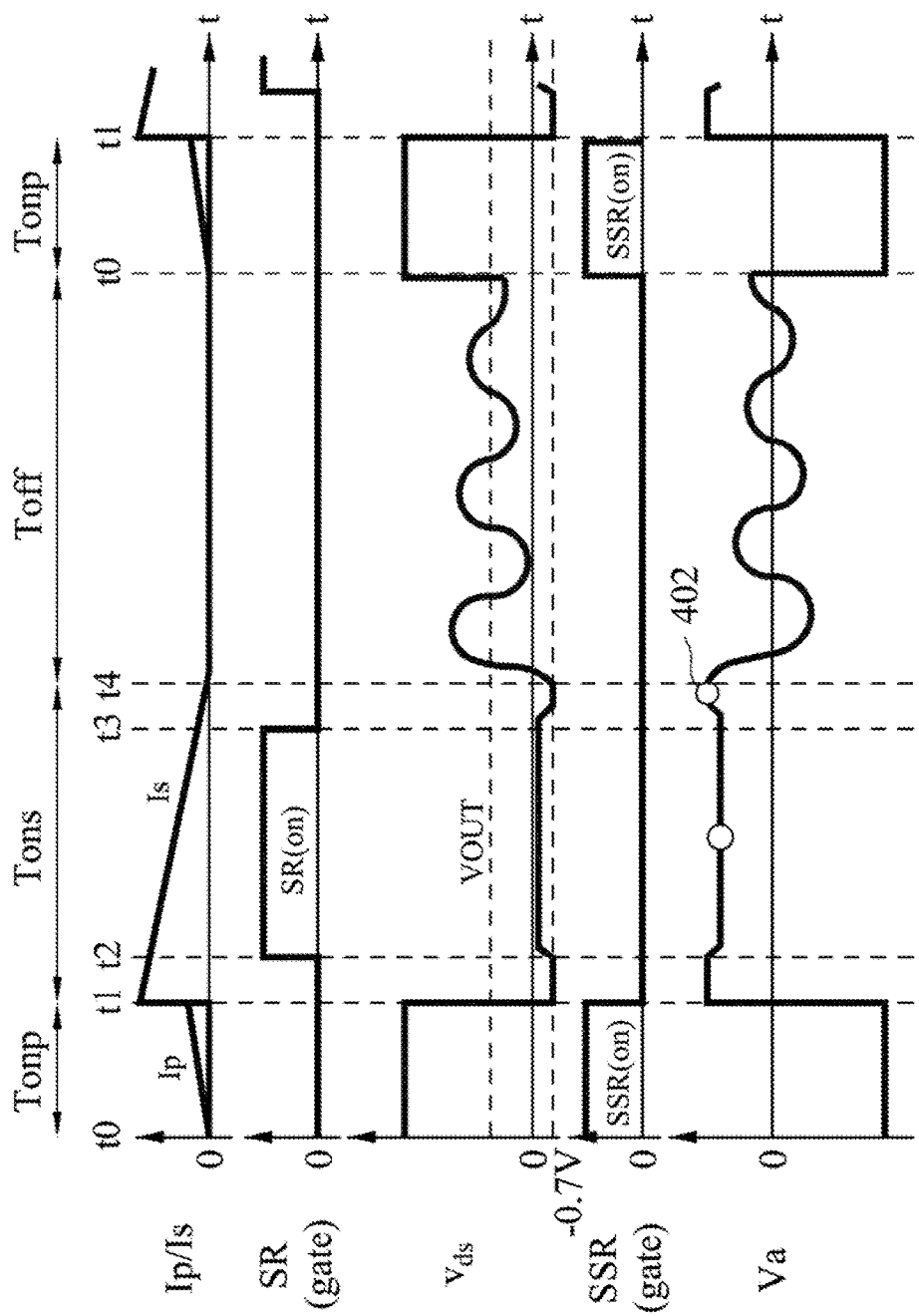
FIG. 4A is a schematic diagram illustrating waveforms of the isolated switching mode power supply operating in a discontinuous conduction mode (DCM) according to one embodiment of the present disclosure.

FIG. 4A is a schematic diagram illustrating waveforms of the isolated switching mode power supply 200 operating in a discontinuous conduction mode (DCM) according to one embodiment of the present disclosure. In the present embodiment, a current Ip is the current flowing through the primary winding 214. A current Is is the current flowing through the secondary winding 222. SR (gate) stands for the waveform used to turn on/off the secondary switch 224. $v_{ds}$ is the voltage between the drain and the source of the secondary switch 224. SSR (gate) stands for the waveform used to turn on/off the primary switch 216. A voltage Va is the voltage on the additional winding 218. A duration Tonp stands for the operating duration of the primary side circuit 210. A duration Tons stands for the operating duration of the secondary side circuit 220. A duration Toff is the duration where the current Is is 0. Timing points t0 to t4 stands for different timing points in a cycle of the isolated switching mode power supply 200. A voltage VOUT is an output voltage on the second capacitor C12.

In FIG. 4A, when the SR controller 226 turns off the secondary switch 224 to discharge the secondary winding 222 at the timing point t3, the additional winding 218 induces the secondary winding 222 to generate a voltage increment 402. Then, the primary-side controller 212 turns on the primary switch 216 to enable the primary winding 214 of the primary side circuit 210 to transfer the energy to the secondary winding 222 of the secondary side circuit at the timing point t0 in the next cycle. Therefore, the primary switch 216 and the secondary switch 224 are not simultaneously turned on, such that the possibility of the breaking transformer 230 can be significantly reduced.

Figure 4B:
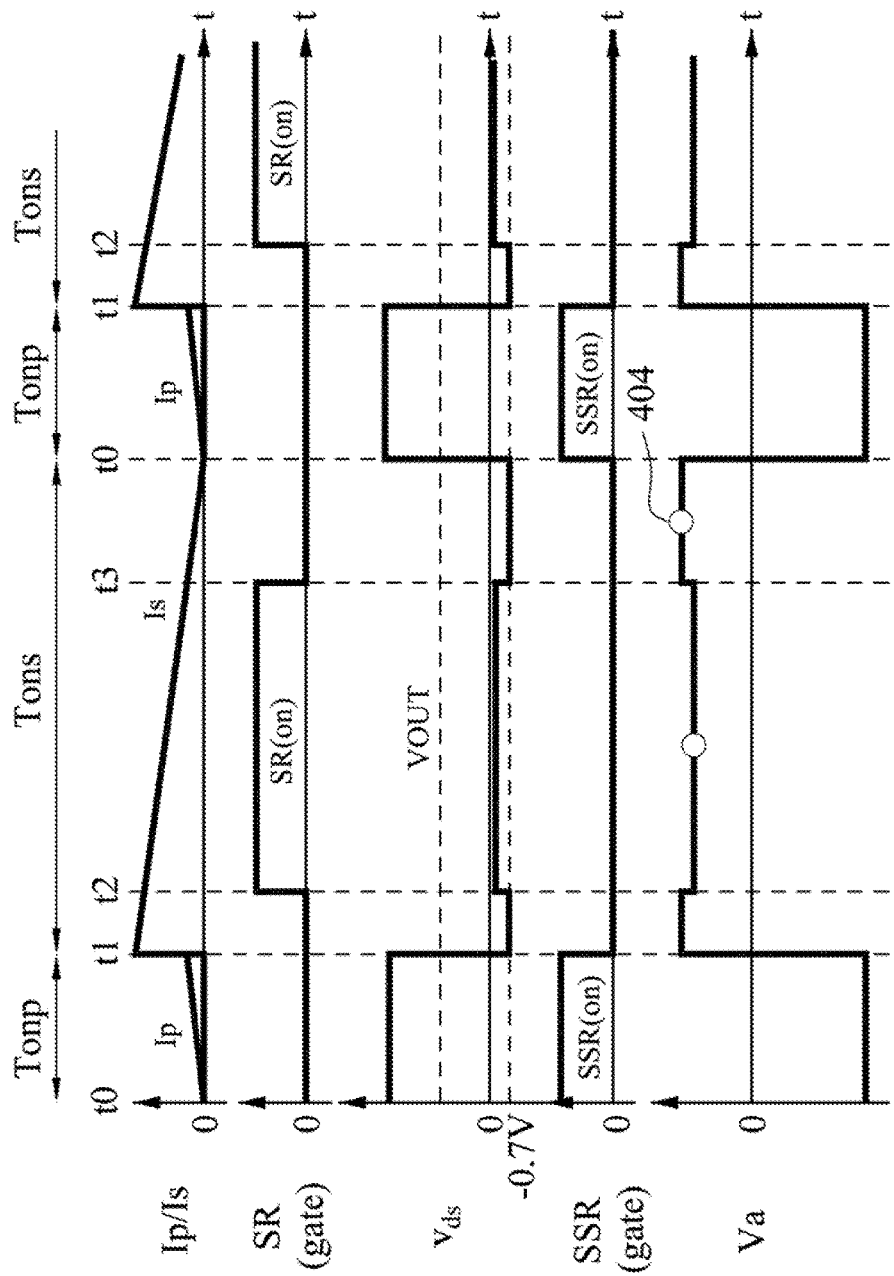
FIG. 4B is a schematic diagram illustrating waveforms of the isolated switching mode power supply operating in a continuous conduction mode (CCM) according to one embodiment of the present disclosure.

FIG. 4B is a schematic diagram illustrating waveforms of the isolated switching mode power supply 200 operating in a continuous conduction mode (CCM) according to one embodiment of the present disclosure. The meanings of the notations in FIG. 4B can be referred to the descriptions of FIG. 4A, and will not be described again herein.

In FIG. 4B, when the SR controller 226 turns off the secondary switch 224 to discharge the secondary winding 222 at the timing point t3, the additional winding 218 induces the secondary winding 222 to generate a voltage increment 404. Then, the primary-side controller 212 turns on the primary switch 216 to enable the primary winding 214 of the primary side circuit 210 to transfer the energy to the secondary winding 222 of the secondary side circuit at the timing point t0 in the next cycle. Therefore, the primary switch 216 and the secondary switch 224 are not simultaneously turned on, such that the possibility of breaking the transformer 230 can be significantly reduced.

It should be noted that, when the SR controller 226 operates in the prediction mode, the possibility of breaking the transformer 230 is relatively high if the mechanism of turning on and off the secondary switch 224 and the primary switch 216 is not properly designed, such as in conventional methods. Specifically, since the SR controller 226 operating in the prediction mode determines the mechanism of turning off the secondary switch 224 according to the waveform in the previous cycle, the SR controller 226 cannot precisely turn off the secondary switch 224 at required timings. Under this situation, if the primary-side controller 212 accidentally turns on the primary switch 216 before the SR controller 226 turns off the secondary switch 224, the transformer 230 will be damaged.

However, with the method provided in the present disclosure, the primary-side controller 212 enables the primary side circuit 210 to transfer the energy to the secondary side circuit 220 only if the primary-side controller 212 detects the first message (e.g., the voltage increment 404). As a result, the primary-side controller 212 will not accidentally turn on the primary switch 216 before the SR controller 226 turns off the secondary switch 224, such as in conventional methods, and hence the possibility of damaging the transformer 230 can be significantly reduced.

Figure 5A:
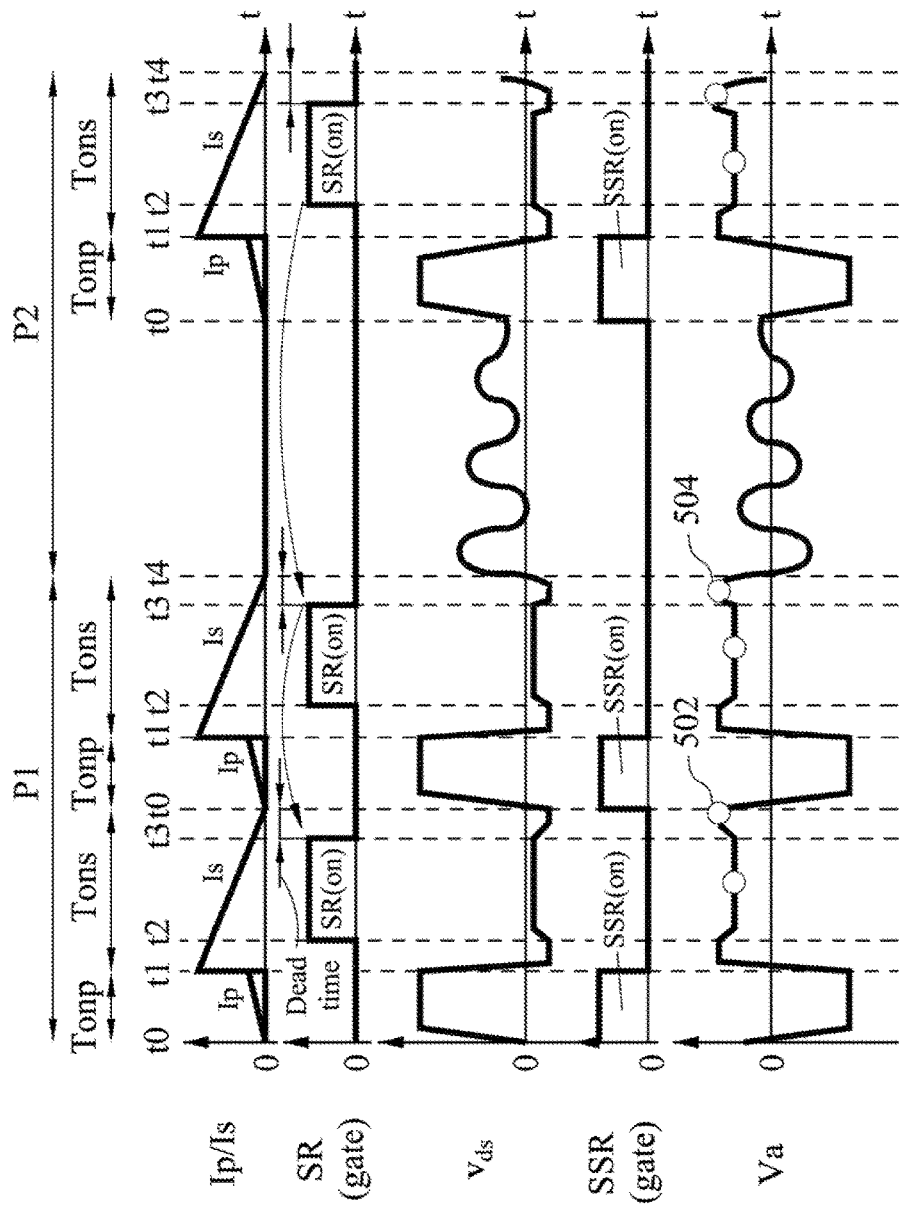
FIG. 5A is a schematic diagram illustrating waveforms of the isolated switching mode power supply switched from the CCM to the DCM according to one embodiment of the present disclosure.

FIG. 5A is a schematic diagram illustrating waveforms of the isolated switching mode power supply 200 switched from the CCM to the DCM according to one embodiment of the present disclosure. The meanings of the notations in FIG. 5A may also be referred to the descriptions of FIG. 4A, and will not be described again herein.

In FIG. 5A, the primary-side controller 212 enables the primary side circuit 210 to transfer the energy to the secondary side circuit 220 if the primary-side controller 212 detects the first message (e.g., a voltage increment 502) during a CCM phase P1. In the last cycle of the CCM phase P1, the isolated switching mode power supply 200 is switched to a DCM phase P2 at the timing point t4. When the SR controller 226 turns off the secondary switch 224 to discharge the secondary winding 222 at the timing point t3 in the last cycle of the CCM phase P1, the additional winding 218 induces the secondary winding 222 to generate a voltage increment 504. Then, the primary-side controller 212 turns on the primary switch 216 to enable the primary winding 214 of the primary side circuit 210 to transfer the energy to the secondary winding 222 of the secondary side circuit at the timing point t0 in the first cycle of the DCM phase P2.

That is, the method provided in the present disclosure can also be applied to lower the possibility of damaging the transformer 230 when the isolated switching mode power supply 200 is switched from the CCM to the DCM.

Figure 5B:
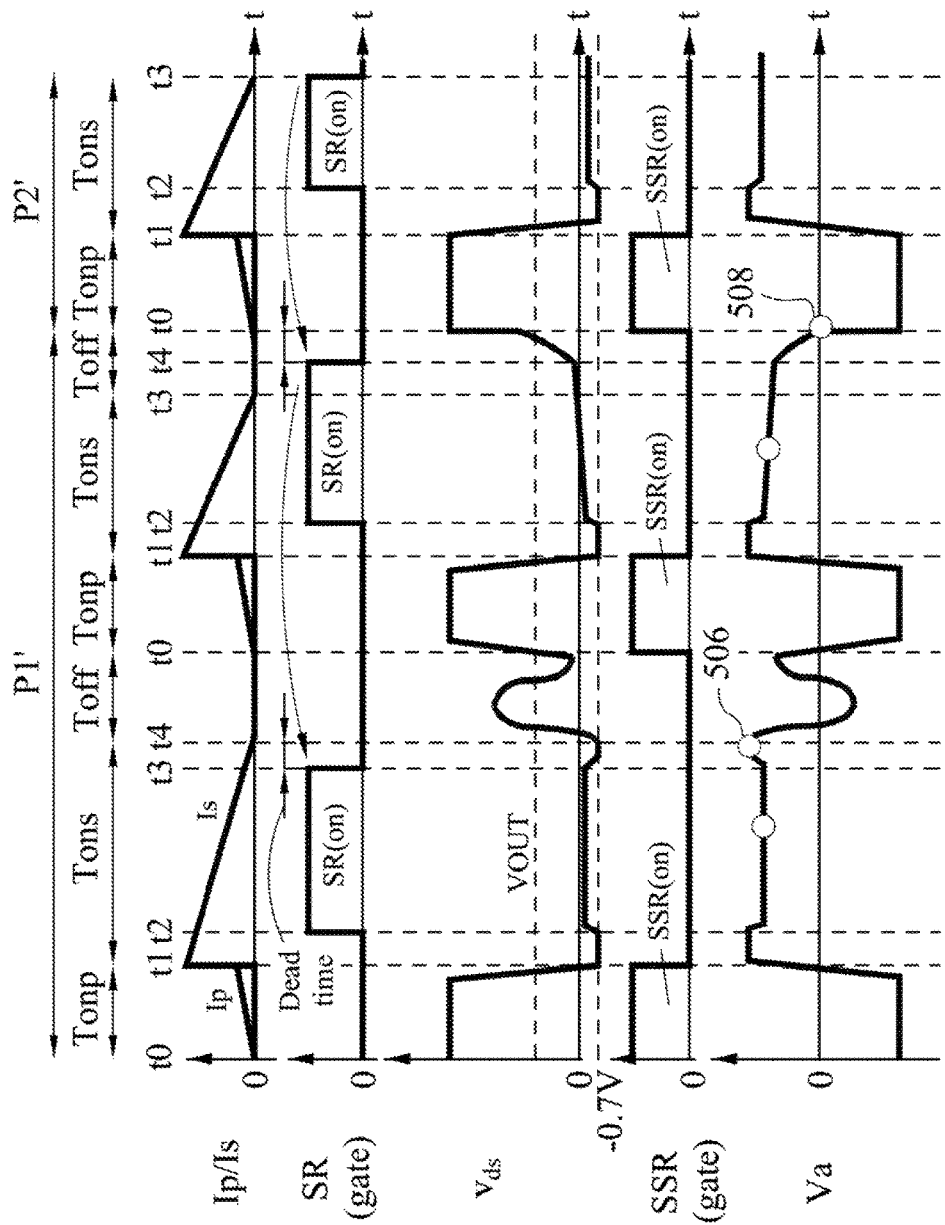
FIG. 5B is a schematic diagram illustrating waveforms of the isolated switching mode power supply switched from the DCM to the CCM according to one embodiment of the present disclosure.

FIG. 5B is a schematic diagram illustrating waveforms of the isolated switching mode power supply 200 switched from the DCM to the CCM according to one embodiment of the present disclosure. The meanings of the notations in FIG. 5B may also be referred to the descriptions of FIG. 4A, and will not be described again herein.

In FIG. 5B, the primary-side controller 212 enables the primary side circuit 210 to transfer the energy to the secondary side circuit 220 if the primary-side controller 212 detects the first message (e.g., a voltage increment 506) during a DCM phase P1'. In the last cycle of the DCM phase P1', the isolated switching mode power supply 200 is switched to a CCM phase P2'. When the SR controller 226 turns off the secondary switch 224 to discharge the secondary winding 222 at the timing point t4 in the last cycle of the DCM phase P1', the additional winding 218 induces the secondary winding 222 to generate a voltage level 508 lower than 0 volt. Then, the primary-side controller 212 turns on the primary switch 216 to enable the primary winding 214 of the primary side circuit 210 to transfer the energy to the secondary winding 222 of the secondary side circuit at the timing point t0 in the first cycle of the CCM phase P2'.

Specifically, when the isolated switching mode power supply 200 is being switched from the DCM to the CCM, the discharging time of the current Is becomes shorter, and hence the duration of the secondary switch 224 being turned on is relatively longer. Under this situation, the additional winding 218 induces a voltage oscillation, such as generating the voltage level 508 lower than 0 volt, rather than a voltage increment as in the previous embodiments. When detecting the voltage level 508, the primary-side controller 212 turns on the primary switch 216 to enable the primary side circuit 210 to transfer energy to the secondary side circuit 220 since the voltage level 508 lower than 0 volt is also one type of the first message.

That is, by considering the voltage level lower than 0 volt as the first message, the method proposed in the present disclosure can also be applied to lower the possibility of damaging the transformer 230 when the isolated switching mode power supply 200 is switched from the DCM to the CCM.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An isolated switching mode power supply, comprising:
a primary side circuit, comprising:
   a primary-side controller; and
   an additional winding coupled to the primary-side controller; and
a secondary side circuit coupled to the primary side circuit, the secondary side circuit comprising:
   a secondary winding coupled to the primary side circuit;
   a secondary switch coupled to the secondary winding; and
   a synchronous rectifier (SR) controller coupled to the secondary winding and the secondary switch,
   wherein the SR controller is configured to turn off the secondary switch to trigger the secondary winding to feed back a first message to the primary side circuit; and
the primary-side controller enables the primary side circuit to transfer energy to the secondary side circuit if the primary-side controller detects the first message from the additional winding, the first message is a voltage change occurring on the additional winding of the primary side circuit, the first message is a voltage increment in an operating duration of the secondary side circuit, the operating duration represents a time interval between a timing point when a primary switch of the primary side circuit is turned off and a timing point when a current of the secondary winding reaches zero, and the additional winding is configured for receiving the first message through inducing the secondary winding.

2. The isolated switching mode power supply of claim 1, wherein the primary-side controller is prohibited to enable the primary side circuit to transfer the energy to the secondary side circuit if the primary-side controller fails to detect the first message.

3. The isolated switching mode power supply of claim 1, wherein the primary side circuit further comprises:
   a primary winding configured to transfer the energy to the secondary winding;
   the primary switch coupled to the primary winding and the primary-side controller.

4. The isolated switching mode power supply of claim 3, wherein a first terminal of the primary winding is coupled to a first terminal of the primary switch, a first output of the primary-side controller is coupled to a control terminal of the primary switch, a first terminal of the additional winding is coupled to a first input of the primary-side controller through a diode and is coupled to a second input of the primary-side controller, and a second terminal of the additional winding is coupled to a ground, the primary side circuit further comprising:
   a power source having a first terminal coupled to a second terminal of the primary winding, and a second terminal coupled to a ground terminal of the primary-side controller, wherein the ground terminal of the primary-side controller is coupled to the ground;
   a first resistor, wherein a first terminal of the first resistor is coupled to the first terminal of the power source, and a second terminal of the first resistor is coupled to a first input of the primary-side controller;
   a capacitor having a first terminal coupled to a second terminal of the first resistor, and a second terminal coupled to the ground;
   a second resistor, wherein a first terminal of the second resistor is coupled to a second terminal of the secondary switch and a second input of the primary-side controller, and a second terminal of the second resistor is coupled to the ground;
   the diode having an anode coupled to the first terminal of the additional winding, and a cathode coupled to the first input of the primary-side controller; and
   a phototransistor having a first terminal coupled to a second output of the primary-side controller, and a second terminal coupled to the ground.

5. The isolated switching mode power supply of claim 3, wherein the SR controller is configured to turn off the secondary switch to discharge the secondary winding, so as to cause the voltage change on the additional winding of the primary side circuit.

6. The isolated switching mode power supply of claim 3, wherein the primary-side controller enables the primary side circuit to transfer the energy to the secondary side circuit by turning on the primary switch.

7. The isolated switching mode power supply of claim 1, wherein the SR controller operates in a prediction mode or a current mode.

8. The isolated switching mode power supply of claim 1, wherein the isolated switching mode power supply operates in a continuous conduction mode or a discontinuous conduction mode.

9. The isolated switching mode power supply of claim 1, wherein the secondary side circuit further comprises a load circuit;
   wherein a first terminal of the secondary winding is coupled to a first terminal of the load circuit and an input of the SR controller, a second terminal of the secondary winding is coupled to a first terminal of the secondary switch, a control terminal of the secondary switch is coupled to an output of the SR controller, and a second terminal of the secondary switch is coupled to a ground terminal of the SR controller and a second terminal of the load circuit.

10. The isolated switching mode power supply of claim 9, wherein the load circuit comprises:
   a first resistor having a first terminal coupled to the first terminal of the secondary winding;
   a light emitting diode having an anode coupled to a second terminal of the first resistor;
   a Zener diode having a cathode coupled to a cathode of the light emitting diode and an anode coupled to the ground;
   a second resistor having a first terminal coupled to the first terminal of the secondary winding;
   a third resistor having a first terminal coupled to a second terminal of the second resistor and a second terminal coupled to the ground;
   a fourth resistor having a first terminal coupled to the cathode of the light emitting diode;
   a first capacitor having a first terminal coupled to the second terminal of the second resistor and a second terminal coupled to a second terminal of the fourth resistor; and a second capacitor having a first terminal coupled to the first terminal of the secondary winding and a second terminal coupled to the ground.

11. The isolated switching mode power supply of claim 1, wherein the secondary switch is an SR Metal-Oxide-Semiconductor Field-Effect Transistor (MOSFET), and when the SR controller turns off the secondary switch, the secondary switch reverts to a diode.

12. A control method of an isolated switching mode power supply which comprises a primary side circuit and a secondary side circuit, the primary side circuit comprising a controller, the secondary side circuit comprising a secondary winding, a secondary switch and a synchronous rectifier (SR) controller, the method comprising:

turning off, by the SR controller, the secondary switch to trigger the secondary winding to feed back a first message to primary side circuit; and enabling, by the primary-side controller, the primary side circuit to transfer energy to the secondary side circuit if the primary-side controller detects the first message from the additional winding, the first message is a voltage change occurring on the additional winding of the primary side circuit, the first message is a voltage increment in an operating duration of the secondary side circuit, the operating duration represents a time interval between a timing point when a primary switch of the primary side circuit is turned off and a timing point when a current of the secondary winding reaches zero, and the additional winding is configured for receiving the first message through inducing the secondary winding.

13. The method of claim 12, wherein the primary-side controller is prohibited to enable the primary side circuit to transfer the energy to the secondary side circuit if the primary-side controller fails to detect the first message.

14. The method of claim 12, wherein the primary side circuit further comprises a primary winding, the primary switch and an additional winding, and the first message is a voltage change occurring on the additional winding of the primary side circuit, and the step of turning off, by the SR controller, the secondary switch to trigger the secondary winding feeding back the first message to primary side circuit comprises:

turning off, by the SR controller, the secondary switch to discharge the secondary winding to cause the voltage change on the additional winding of the primary side circuit.

15. The method of claim 14, wherein the step of enabling, by the primary-side controller, the primary side circuit transferring the energy to the secondary side circuit if the primary-side controller detects the first message comprises:

enabling, by the primary-side controller, the primary side circuit to transfer the energy to the secondary side circuit by turning on the primary switch.

16. The method of claim 12, wherein the SR controller operates in a prediction mode or a current mode.

17. The method of claim 12, wherein the isolated switching mode power supply operates in a continuous conduction mode or a discontinuous conduction mode.

18. The method of claim 12, wherein the secondary switch is an SR Metal-Oxide-Semiconductor Field-Effect Transistor (MOSFET), and when the SR controller turns off the secondary switch, the secondary switch reverts to a diode.

* * * * *